US012160066B2

(12) United States Patent
Krahl

(10) Patent No.: US 12,160,066 B2
(45) Date of Patent: Dec. 3, 2024

(54) CONNECTOR ASSEMBLY, CONNECTOR FOR SUCH A CONNECTOR ASSEMBLY, AND METHOD FOR INSTALLING THE CONNECTOR ASSEMBLY

(71) Applicant: Knorr-Bremse Systeme Fuer Nutzfahrzeuge GmbH, Munich (DE)

(72) Inventor: Martin Krahl, Ludwigsburg (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 324 days.

(21) Appl. No.: 17/778,973

(22) PCT Filed: Nov. 11, 2020

(86) PCT No.: PCT/EP2020/081712
§ 371 (c)(1),
(2) Date: May 23, 2022

(87) PCT Pub. No.: WO2021/104863
PCT Pub. Date: Jun. 3, 2021

(65) Prior Publication Data

US 2022/0416470 A1 Dec. 29, 2022

(30) Foreign Application Priority Data

Nov. 26, 2019 (DE) ..................... 10 2019 131 955.2

(51) Int. Cl.
*H01R 13/52* (2006.01)
*H01R 43/00* (2006.01)

(52) U.S. Cl.
CPC ....... *H01R 13/5202* (2013.01); *H01R 43/005* (2013.01); *H01R 2201/26* (2013.01)

(58) Field of Classification Search
None
See application file for complete search history.

(56) References Cited

U.S. PATENT DOCUMENTS 5,735,697 A * 4/1998 Muzslay .............. H01R 13/405 439/83
6,869,293 B2 * 3/2005 Kamiya ............... H05K 5/0247 439/76.1

(Continued)

FOREIGN PATENT DOCUMENTS

CN 101553957 A 10/2009
CN 102015117 A 4/2011

(Continued)

OTHER PUBLICATIONS

International Search Report dated Feb. 5, 2021 in connection with PCT/EP2020/081712.

*Primary Examiner* — Tho D Ta
(74) *Attorney, Agent, or Firm* — NORTON ROSE FULBRIGHT US LLP; Gerard A. Messina

(57) ABSTRACT

A connector module, including: a housing, a connector, which is arranged in the housing, at least in part, and which has a longitudinal axis in a connecting direction to a mating connector, wherein an axial outer face of the connector with respect to the longitudinal axis is radially spaced from an opposing axial inner face of the housing, at least in part, and a sealing element, in which the sealing element is arranged in the radial clearance formed between the axial outer face of the connector and the opposing axial inner face of the housing and forms a sealing face with the axial outer face of the connector and the opposing axial inner face of the housing in each case. A related connector and method are also described.

14 Claims, 1 Drawing Sheet

(56) References Cited

U.S. PATENT DOCUMENTS

| | | | | |
|---|---|---|---|---|
| 10,090,617 | B2 * | 10/2018 | Nakatani | G06F 1/1637 |
| 10,193,252 | B2 * | 1/2019 | Sakamoto | H01R 12/714 |
| 2002/0125651 | A1 | 9/2002 | Onoda | |
| 2018/0163728 | A1 | 6/2018 | Zugelder et al. | |
| 2019/0052011 | A1 | 2/2019 | Kondo | |

FOREIGN PATENT DOCUMENTS

| | | | |
|---|---|---|---|
| CN | 104718665 | A | 6/2015 |
| CN | 205429263 | U | 8/2016 |
| CN | 107592949 | A | 1/2018 |
| CN | 109075494 | A | 12/2018 |
| DE | 3042293 | A1 | 5/1982 |
| DE | 102006019174 | A1 | 1/2007 |
| DE | 212010000212 | U1 | 4/2013 |
| DE | 102011089081 | A1 | 6/2013 |
| DE | 102013223309 | A1 | 6/2014 |
| DE | 112013001637 | T5 | 12/2014 |
| DE | 202015007517 | U1 | 11/2015 |
| DE | 102017105890 | A1 | 9/2017 |
| EP | 2947723 | A1 | 11/2015 |
| EP | 3402010 | A1 | 11/2018 |
| GB | 2492497 | A | 1/2013 |
| JP | 2018147844 | A | 9/2018 |

* cited by examiner

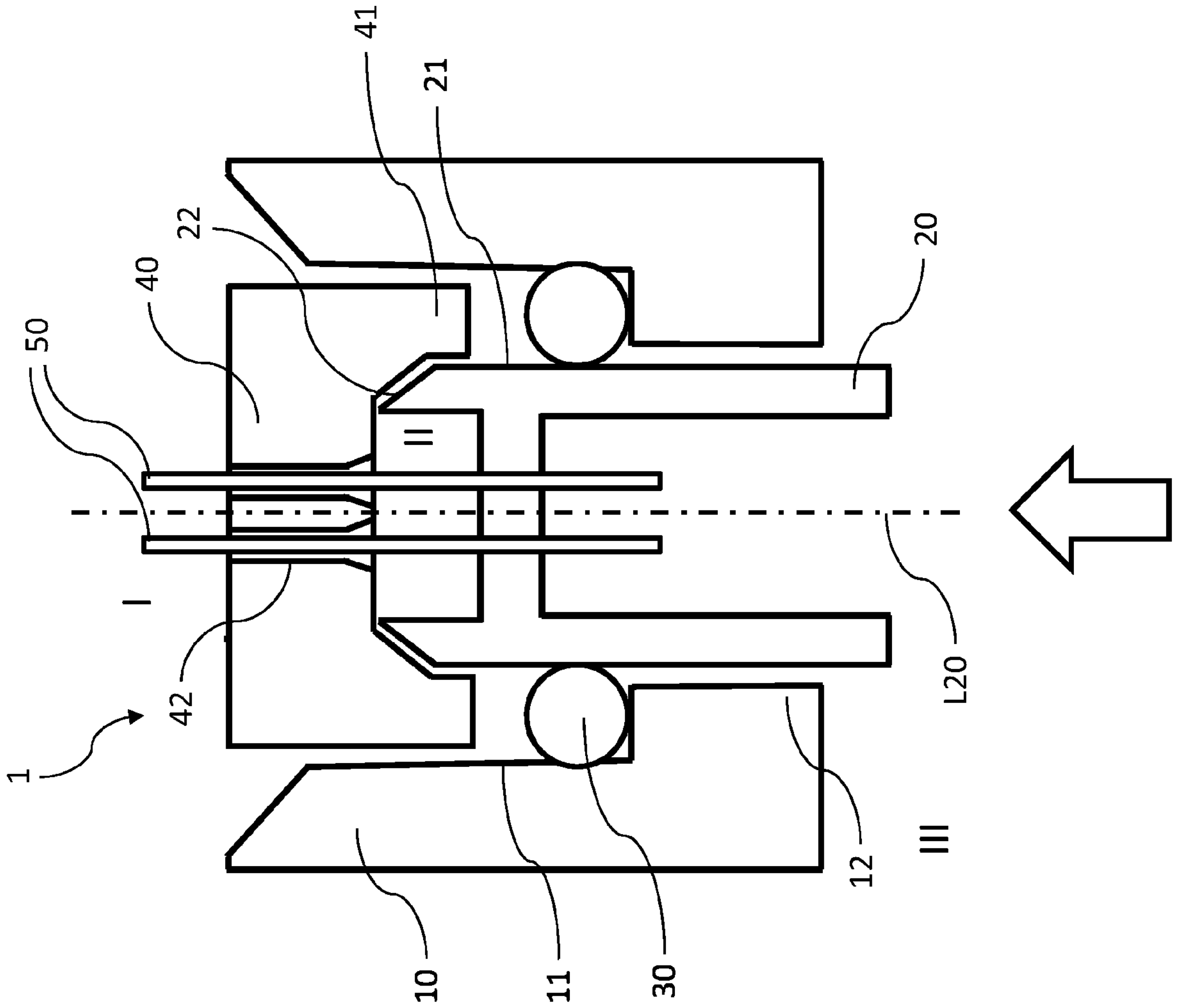
1
10
11
12
20
21
22
30
40
41
42
50
L20
I
II
III

CONNECTOR ASSEMBLY, CONNECTOR FOR SUCH A CONNECTOR ASSEMBLY, AND METHOD FOR INSTALLING THE CONNECTOR ASSEMBLY

FIELD OF THE INVENTION

The present invention relates to a connector module, a connector for connecting to a mating connector for such a connector module and a method for assembling the connector module.

BACKGROUND INFORMATION

For a plurality of modules, in particular pneumatic modules for trucks, with electrical components contained therein, an energy supply and/or signal transmission, for example of sensor signals or other signals via a CAN, is provided by connecting a connector of the module to a mating connector, which is often a wired part of a plug connection. Conversely, however, external devices can also be supplied with energy, and/or signals can be input and/or output, via the module. In this case, it is necessary to protect various components of the module, for example electrical contacts or breakable elements, from external force effects and other environmental influences, such as moisture or dirt. Particularly in the case of modules which are installed in utility vehicles or the like, stringent demands are made with regard to the protection of correspondingly vulnerable module components or parts thereof due to the environmental conditions which are inherent to their application. Such protection is realized by a housing for receiving the components to be protected, wherein a connector which is likewise received therein requires a seal between the connector and the housing in order to seal the housing interior with respect to the above-mentioned environmental influences, such as moisture or dirt.

With regard to the sealing of the housing interior, it is believed to be understood to use sealing elements which form axial sealing faces with respect to a longitudinal axis of the connector which extends in the connecting direction of the connector to a mating connector. By way of example, a connector has a projection which extends outwards in the radial direction with respect to the longitudinal axis and has a receptacle, such as a groove, for a sealing element. The groove is open in the assembly direction, i.e. in the axial direction. During assembly, the connector is pushed into a connector receptacle of the housing in the direction of the housing interior, wherein the receptacle, and therefore a sealing element located therein, faces a likewise radially extending face of the housing. In the final assembly position, the sealing element is acted upon by a pressure force between the radial receiving face of the connector and the radial housing face so that an axial seal is formed between the radial sealing face of the sealing element and the receptacle for the sealing element and between the radial sealing face of the sealing element and the radial housing face. In an alternative configuration, the connector is pushed through the housing interior into a connector receptacle of the housing, i.e. in the opposite assembly direction to the above-mentioned example. The connector similarly has a radial projection with a receptacle for a sealing element. During assembly, the connector is pushed through the housing interior into a connector receptacle of the housing, wherein the receptacle, and therefore a sealing element located therein, faces a likewise radially extending face of the housing. In the final assembly position, the sealing element is acted upon by a pressure force between the radial receiving face of the connector and the radial housing face so that an axial seal is also formed here.

These types of connector seal require a relatively large installation space in the radial direction. Moreover, a corresponding radial projection needs to be produced on the connector via a manufacturing technique. However, from a manufacturing perspective, it is also necessary to pay attention to the sealing faces on the housing, which require a comparatively high surface quality. This is ensured by tool inserts in the casting tool—particularly in the case of a cast metal housing, and if the assembly of the connector takes place in the direction of the housing interior—which tool inserts are linked to corresponding costs.

SUMMARY OF THE INVENTION

An object of the invention is therefore to provide a connector module, which enables more compact sealing, at least in the radial direction with respect to a longitudinal axis of the connector, and which can be produced in a simpler and therefore more cost-effective manner.

The object may be achieved by a connector module, a connector, a method for assembling a connector module according to the independent claims. Advantageous developments of the invention are contained in the dependent claims.

According to the invention, the connector module comprises a housing, a connector, which is arranged in the housing, at least in part, and which has a longitudinal axis in a connecting direction to a mating connector, wherein an axial outer face of the connector with respect to the longitudinal axis is radially spaced from an opposing axial inner face of the housing, at least in part, and a sealing element, wherein the sealing element is arranged in the radial clearance formed between the axial outer face of the connector and the opposing axial inner face of the housing and forms a sealing face with the axial outer face of the connector and the opposing axial inner face of the housing in each case.

An axial outer face or an axial inner face is understood here to be a face which extends in the axial direction. In the case of a cylinder, this would be the cylinder lateral face, for example. Alternatively, such an axial face can also be understood to be a circumferential face in the direction of the longitudinal axis. In this connection, both the connector and the housing can be formed to be rotationally symmetrical. However, in many cases, the configuration requirements also specify geometries which differ from this. In addition, it should be noted that the terms “radial” and “axial” below, unless explicitly defined otherwise, relate to the longitudinal axis of the connector in the receiving direction or connecting direction to a mating connector, so that a corresponding reference does not necessarily need to be indicated.

According to the above configuration, with respect to the longitudinal axis of the connector, the sealing element therefore forms a radial seal with an axial outer face of the connector and an axial inner face of the housing. In contrast to an axial seal, as has been described with respect to the prior art, such a radial seal requires less installation space in the radial direction, thus enabling a more compact configuration of the connector module, at least in this direction. Moreover, in most cases, the spatial requirement in the axial direction for receiving the sealing element components, which are compressed by the pressure force in the installed state, is available in any case owing to the length for receiving the connector in the housing. Accordingly, this results in a compact configuration overall.

Moreover, a radial seal requires less positional accuracy of the connector with respect to the housing in the axial direction. By way of example, with a radial clearance between the axial outer face of the connector and the axial inner face of the housing for the purpose of forming a radial seal, it is possible to form the seal via the sealing element in any part of this radial clearance. In other words, the sealing element arranged in this radial clearance can be displaced along the axial faces upon the relative movement between the connector and the housing during the assembly of the connector, without thereby impairing the sealing capability. Likewise, the connector does not need to assume a precise final position, at least with respect to the radial seal.

The simple construction of the radial seal moreover enables the use of O-rings, which have a lower level of complexity and therefore high availability.

However, the radial seal can also have advantages over an axial seal with regard to the production of the housing and the connector. For example, with a casting production technique, comparatively good surface qualities can be provided in the region of sealing faces. In the case of an axial seal, if the connector is subsequently assembled from a housing outer side, it is required that changeable inserts for the housing are used so as to be able to ensure an appropriate surface quality. In the case of a radial seal, the sealing faces can be moved to a region which already provides for the use of appropriate changeable inserts in any case due to further functional requirements. Moreover, the assembly in the case of a radial seal does not require an insertion chamfer for the sealing element on a housing outer side, which would need to be taken into account during production and can only be produced with difficulty, if at all, in the conventionally used casting process.

In one configuration of the connector module, the housing has a housing projection, which points in the direction of the connector in the radial direction with respect to the longitudinal axis of the connector, and the sealing element is arranged on a side of the housing projection which faces a housing interior in the connecting direction to a mating connector.

The projection forms a receptacle for the sealing element, so that this can be held in an assembly position without the addition of further aids. However, the projection furthermore also provides protection for the sealing element against external influences. In this regard, it can be advantageous to form the projection such that the clearance between the axial inner face of the projection and an axial outer face of the connector in the assembled state is as small as possible in this region.

Alternatively or additionally, the connector has a connector projection, which points in the direction of the housing in the radial direction with respect to the longitudinal axis of the connector, and the sealing element is arranged on a side of the connector projection which faces a housing interior in the connecting direction to a mating connector.

The functionality of the connector projection is realized analogously to that of the housing projection. If both projections are provided, the sealing element can be arranged either on the connector projection or on the housing projection during assembly. This gives the option of being able to selectively choose the arrangement according to the assembly conditions.

With regard to a housing projection, a connector projection or a combination of both projections, advantages in terms of a modular system are also realized since it is thus possible to combine standard components or modules with variants.

In particular, the connector has a chamfer at an end of the axial outer face of the connector which faces the housing interior in the connecting direction to a mating connector, and/or the housing has a chamfer at an end of the axial inner face of the housing which faces away from the housing interior in the connecting direction to a mating connector.

The chamfer of the connector tapers from an axial outer face to the end which faces the housing interior in the connecting direction to a mating connector. In other words, in the region of the chamfer, the connector has a form which tapers in the direction of the longitudinal axis of the connector at the end which faces the housing interior in the connecting direction to a mating connector. In the case of a chamfer on the housing, the chamfer tapers from an axial inner face to the end of the housing which faces away from the housing interior in the connecting direction to a mating connector. In other words, in the region of the chamfer, the housing has a form which tapers outwards with respect to the longitudinal axis at the end which faces away from the housing interior in the connecting direction to a mating connector.

In this case, the term "chamfer" is not restricted to a straight incline; it can also have a different contour—for example it can extend concavely or convexly—although, in many cases, a straight incline can be produced in a simple manner via a manufacturing technique. The chamfer therefore comprises at least one sloping portion in the axial direction, wherein, as explained above, this does not necessarily have to extend in a straight line in the manner of a straight incline. However, a sloping portion in the form of a straight incline is advantageous in many cases for the aforementioned manufacturing reasons.

The sealing element can firstly be caught by the connector and/or housing via the axial chamfer and stretched and/or compressed in a guided manner over the subsequent course of the chamfer. For example, if the housing has a housing projection, as described above, with a sealing element arranged on the side thereof which faces the housing interior, and the connector, during assembly, is inserted into the housing from a side of the projection which faces away from the housing interior, a chamfer formed at the end which faces the housing interior in the connecting direction to a mating connector acts on a side face of the sealing element which faces away from the axial inner face of the housing. In particular, the chamfer is formed such that the foremost end of that end of the axial outer face of the connector which faces the housing interior in the connecting direction to a mating connector does not have a smaller clearance from the axial inner face of the housing in the region in which the sealing element is arranged than the clearance between the side face of the sealing element which faces away from the axial inner face of the housing and the axial inner face of the housing in this region. Damage to the sealing element by the connector is thus prevented. The sealing element lying on the end of the connector can likewise be prevented from being pushed further in the direction of the housing interior by the connector without being stretched between the axial outer face of the connector and the axial inner face of the housing in order to form the respective sealing faces. The sealing element is therefore stretched and compressed by the chamfer of the connector. The stretching procedure refers to a radial elongation of the sealing element, whilst a compression refers to the formation of the sealing faces.

If the housing has the above chamfer, the sealing element is not stretched thereby; instead, this chamfer acts on the sealing element in order to then compress it upon a further relative movement between the connector and the housing in the positioning direction.

In one development, the chamfer comprises at least two sloping portions.

The term "sloping portion" here is also not restricted to a portion with a straight incline; it can also comprise portions with a contour—for example a concave or convex configuration. However, a straight incline has likewise proven advantageous from a manufacturing perspective.

The sloping portions can have a different contour, a different surface quality and/or, as will be explained further below, a different slope and/or they can be separated from one another by an intermediate portion.

It is therefore possible to set a specific guiding behavior of the chamfer via the at least two sloping portions.

In one configuration, the sloping portions are separated by an intermediate portion extending substantially parallel to the longitudinal axis and/or they have different slopes.

As a result of separating the sloping portions by an intermediate portion, the sealing element can firstly be grabbed via a first sloping portion and held in the intermediate portion in order to be moved with the chamfer without further stretching, for example. Only then does further stretching take place via the second sloping portion.

The sealing element can be stretched and/or compressed at different rates via the different slopes of the sloping portions. For example in a first portion with a comparatively steep slope, the sealing element can be grabbed and then stretched and/or compressed by a first amount relatively quickly. In a second portion with a shallower slope, the further stretching and/or compression takes place more slowly or over a larger movement section of the connector in the direction of the housing interior. Owing to this slower stretching and/or compression of the sealing element in a region in which initial contact pressures between the sealing element and the axial inner face of the housing or the axial outer face of the connector occur as a result of the stretching and/or compression, the risk of damage to the sealing element is reduced.

In particular, the connector module comprises a strip, which is arranged on a side of the connector which faces the housing interior in the connecting direction to a mating connector and at least partially covers the radial clearance formed between the axial outer face of the connector and the opposing axial inner face of the housing.

The strip therefore forms a boundary for the sealing element on its side which faces the housing interior in the longitudinal direction of the connector. This boundary can serve to limit the region for the radial seal accordingly. Likewise, the axial boundary for the sealing element, which is formed by the strip, can be used to hold the sealing element over the connector, at least in the appropriate direction, before the assembly of the connector.

In one configuration, the strip forms a strip projection, which protrudes into the radial clearance formed between the axial outer face of the connector and the opposing axial inner face of the housing.

The possible axial movement of the sealing element can be set accordingly via the length of the strip projection protruding in the longitudinal direction of the connector and into the radial clearance in which the sealing element is arranged. Moreover, the strip projection can also be used to guide and/or center the connector in the housing. With regard to centering, the strip can moreover have, on an inner side, which faces the connector, a chamfer in the direction of the longitudinal axis starting from the strip projection. This chamfer, i.e. the strip chamfer, has in particular a contour which, as a negative of the chamfer of the connector, therefore corresponds to the connector chamfer if such a connector chamfer is provided. The connector chamfer, in particular the described chamfer, can be provided at an end of the axial outer face of the connector which faces the housing interior in the connecting direction to a mating connector, but also in another region of the axial outer face of the connector. In addition to the centering function, a stop can therefore also be realized for secure positioning of the connector in a final assembly position.

In particular, the connector comprises electrical contact pins and the strip is formed as a connector strip for feeding through the electrical contact pins.

The strip provides an additional functionality as a connector strip for feeding through the electrical contact pins. In addition to guiding the electrical contact pins, a housing interior portion is moreover additionally shielded on a strip side which faces away from the connector. The connector strip can moreover have further functional elements.

In one development, the connector strip has through bores for feeding through the electrical contact pins, which through bores are formed with a diameter which tapers, in particular in a funnel-shape, at least over a predetermined portion, beginning on the side which faces the connector.

As a result of the tapering receptacle, the electrical contact pins of the connector can be guided more easily into and through the connector strip. In this regard, the connector strip with correspondingly formed through bores also serves as a centering and positioning aid.

In one configuration, the axial outer face of the connector and/or the axial inner face of the housing has a tangential groove in which the sealing element is at least partially arranged.

For assembly pre-positioning or alternatively or additionally for pre-positioning the sealing element over a housing and/or connector projection, possibly in combination with the above-described strip, a corresponding tangential groove can also be provided in the axial outer face of the connector and/or in the axial inner face of the housing. In addition to its use for assembly pre-positioning, such a groove can also be provided for forming the radial clearance between the axial outer face of the connector and the axial inner face of the housing. For example, such a groove forms a chamber in an axial inner face of the housing, which chamber could alternatively also be formed via a housing projection in conjunction with a strip or with a strip projection of the strip. The number of components to be installed can thus be reduced unless a strip needs to be provided in any case, for example.

In particular, the sealing element is integrally formed with the strip, the connector and/or the housing.

The sealing element can, for example, be sprayed directly onto the strip or the end face of a strip projection formed by the strip or an axial outer face of the connector or on an axial inner face of the housing. It is thus possible to dispense with an arrangement (apparatus, devioe or structure) for pre-positioning the sealing element, for example. In addition to sprayed-on sealing elements consisting of, for example, NBR (acrylonitrile butadiene rubber), HNBR (hydrogenated acrylonitrile butadiene rubber), silicone or Viton, the strip, the connector and/or the housing can also have integrally formed portions, which form the sealing element themselves or in conjunction with another portion of the above-mentioned components. In the latter case, the sealing element is formed from two portions, for example a portion of the connector and a portion of the housing.

The present invention is based on a connector for connecting to a mating connector for a connector module according to the previous embodiments.

The connector accordingly has the features of the connector which have been already described with regard to the connector module and the advantages likewise mentioned in relation thereto.

In particular, the connector can have, on an axial outer face, a connector projection which protrudes outwards therefrom. This connector projection is dimensioned in such a way that a sealing element can be arranged, at least in part, on a side of the housing projection which faces a housing interior when the connector is in an installed state in the housing in the connecting direction to a mating connector. The sealing element is therefore also held by the connector in the non-stretched state.

In an alternative or additional configuration, the connector has a chamfer at an end of the axial outer face of the connector which faces the housing interior in the connecting direction to a mating connector. The chamfer can be configured according to the above embodiments of the connector module.

Further advantageous configurations of the connector are revealed in the description of the connector module and the description relating to the FIGURE.

The invention moreover relates to a method for assembling a connector module according to the previous embodiments, comprising the steps: arranging a sealing element in a housing or around a connector and positioning the connector in the housing along a connecting direction of the connector to a mating connector, wherein the sealing element, during the positioning step, is stretched and/or compressed radially with respect to a longitudinal axis of the connector which extends in the connecting direction.

The method is explained in more detail below with reference to a sealing ring by way of example as a sealing element. In this case, the term "ring" is not restricted to a circular form. The embodiments can also be applied analogously to other sealing elements, unless this is should be seen as impossible due to the specific configuration.

Firstly, the sealing ring is arranged in the housing provided for the connector. This takes place in that it is applied to a side of a housing projection which faces the housing interior. However, the sealing ring can also have a slight pretension against an axial inner face of the housing, so that the sealing ring can also be held in the housing without a housing projection. An arrangement of the sealing ring around the connector can also take place analogously, wherein a connector projection described in relation to the connector module can be used or the sealing ring can already be slightly stretched by the connector so that it is held by the connector. As already described, arrangement options for the purpose of holding the sealing element in such an arrangement are realized via the use of a strip or the provision of a corresponding groove.

The connector is positioned in the housing following the arrangement of the sealing ring. To this end, the connector is moved for example from a housing outer side into a connector receptacle formed in the housing. Alternatively, the housing can also be moved in the sense of a movement reversal.

In the case in which the sealing ring has been previously arranged in the housing, the sealing ring is stretched and compressed by the connector during the positioning of the connector. To this end, the connector has the above-described chamfer, for example. This chamfer is formed according to the previous embodiments at an end of the axial outer face of the connector which faces the housing interior in the connecting direction to a mating connector. However, the chamfer can alternatively also be formed in another region of the axial outer face of the connector.

In the case in which the sealing ring has been previously arranged around the connector, the sealing ring is compressed by the housing during the positioning of the connector. The chamfer of the housing acts on the sealing ring and squeezes it radially upon a further relative movement between the housing and the connector for positioning the connector in the housing, whereby the sealing ring is compressed between the axial inner face of the housing and the axial outer face of the connector in order to form a radial seal.

In one configuration of the method, the positioning of the connector in the housing takes place from a side which faces away from the housing interior.

The connector is therefore inserted into a connector receptacle provided by the housing from the easily accessible outer side of the housing in the direction of the housing interior. However, the housing can also be moved accordingly in the direction of the connector in the sense of a movement reversal.

The invention is explained in more detail below with reference to an embodiment and with the aid of the accompanying FIGURE.

BRIEF DESCRIPTION OF THE DRAWING

The FIGURE shows a connector module with a connector arranged in a housing and a radial seal according to a first embodiment of the invention.

DETAILED DESCRIPTION

The FIGURE shows a connector module 1 with a connector 20 arranged in a housing 10 and a radial seal according to a first embodiment of the invention. The radial seal is formed by a sealing element 30, a sealing ring here, which is compressed in a radial clearance between an axial outer face 21 of the connector 20 and an axial inner face 11 of the housing 10. In this case, the sealing element forms a sealing face with the axial outer face 21 of the connector 20 and a sealing face with the axial inner face 11 of the housing 10. The specifications "axial" and "radial" relate to the longitudinal axis L20 of the connector 20. The housing 10 is only illustrated as a detail here and extends further around the region of the housing interior I in an application-specific form. The connector module of the present exemplary embodiment is part of a pneumatic module for trucks.

In the exemplary embodiment shown, the housing 10 has, in the opening region of the connector receptacle, a radially extending housing projection 12 which points in the direction of the connector. To assemble the connector module 1, the sealing element 30 is applied to a side of the housing projection which faces the housing interior in the subsequent assembly direction of the connector, which is shown by the arrow. In this case, the sealing element 30 is configured such that, when applied to the housing projection 12, it is slightly pretensioned against the axial inner face 11 of the housing 10 so as to be lightly held in the housing 10. Accordingly, in terms of its radial outer dimensions, the sealing element 30 is configured to be marginally larger than the radial face formed by the axial inner face 11 of the housing 10. However, the sealing element 30 may alternatively also be configured to simply be large enough to be able to lie on the housing projection 12. The securing of the sealing element in the assembly position can then be implemented via the strip 40 described below. In particular, however, the sealing element 30 is dimensioned such that a face which points in the direction of the axial outer face 21 of the connector 20 to be installed protrudes over the housing projection 12 in the radial direction so that it can be compressed by the connector 20.

After the sealing element 30 has been applied to the projection, a strip 40, a connector strip here, is inserted into the housing 10 through the housing interior I in the direction of the receiving opening for the connector 20. The strip 40 has a radial circumference, which is adapted to the contour of the axial inner face 11 of the housing 10, so that the strip 40, in the installed state, at least partially covers the radial clearance between the axial inner face 11 of the housing 10 and the radial outer face 21 of the connector 20 which is provided for the radial seal. In the illustrated embodiment, the radial circumference of the strip 40 is smaller than the radial circumference of the axial inner face 11 of the housing 10 in order to enable appropriate insertion. The gap size formed in this way can therefore be kept small to achieve the best centering. However, clearances which are too small can equally result in inhibited movement and/or tilting. As a result of the installed strip 40, the sealing element 30 is chambered between the strip 40 and the housing projection 12 and therefore held in a region in which the radial seal is to be formed.

In the present embodiment, the strip 40 not only serves to chamber the sealing element 30, but, in the installed state, moreover has a connector receptacle on a side which faces the receiving opening of the housing 10 for the connector 20, which connector receptacle is formed by a circumferential strip projection 41, which extends in the direction of the receiving opening of the housing 10. The receptacle is formed such that, at least in part—in the region of the outer connector circumference here—it is complementary to the connector contour to be received. Consequently, the strip 40 can be used for centering and positioning the connector 20 in the housing 10. For centering purposes, the strip 40 has two chamfers here, which taper in the direction of the longitudinal axis L20 and correspond to the chamfers 22 of the connector ends. An end position of the connector 20 in the housing 10 can be defined by the chamfers of the strip or by a stop formed between the chamfers of the strip 40.

The strip 40 shown in the FIGURE likewise serves as a feed-through and positioning aid for the electrical contact pins 50 of the connector 20. To this end, the strip 40 has a number of through bores 42 which at least corresponds to the number of electrical contact pins 50, which through bores extend from a side of the strip 40 which faces the connector 20 or the receiving opening of the housing 10 for the connector 20 in the installed state to the opposite side of the strip 40. To facilitate the insertion of the electrical contact pins 50 into the through bores 42, the through bores are formed in a funnel-shape, at least on the side which faces the connector 20 or the receiving opening of the housing 10 for the connector 20 in the installed state.

Following the positioning of the strip 40, the connector 20 is inserted into the housing 10 through the receiving opening of the housing 10 from an outer side of the housing, as illustrated by the arrow in the FIGURE. The connector 20 has a chamfer 22 at an end of the axial outer face 21 of the connector 20 which faces the housing interior I in the connecting direction to a mating connector. The end which has the chamfer 22 and faces the housing interior I in the connecting direction to a mating connector has an annular form here, wherein, as a result of the chamfer 22, the annulus extends further in the direction of the housing interior I with its inner circumference than with its outer circumference. In other words, the end of the connector 20 which faces the housing interior I in the connecting direction to a mating connector tapers from the outer circumference of the annulus to the inner circumference or tapers in the direction of the longitudinal axis L20. The chamfer 22 has an angle of 45°. In particular, angles between 30° and 45° are provided in many cases, wherein the angle essentially depends on the spatial requirement and the required degree of compression of the sealing element 30.

As a result inserting the connector 20 into the housing 10, the chamfer 22 acts on the sealing element 30 and stretches the sealing element due to the increase in the outer circumferential area of the connector which is associated with the chamfer. The sealing element is thus compressed in the radial clearance formed between the axial outer face 21 of the connector 20 and the axial inner face 11 of the housing 10 and forms a sealing face with the axial outer face 21 of the connector 20 and the axial inner face 11 of the housing 10 in each case. The housing interior I and the housing interior II formed by the connector 20 and the strip 40 are thus sealed radially with respect to the exterior III. With sealing contact or by using further sealing elements, the housing interior II can be further sealed with respect to the housing interior I and represents a sub-region of the housing interior I. Separate sealing of the housing interior II can be provided for example in the case of unprotected contact pins 50 or unprotected regions of the contact pins 50, if these might be subject to influences via the housing interior I or need to be secured in a redundant manner in addition to the radial seal.

The invention is not restricted to the described embodiments. Although the connector module according to the FIGURE is based on a rotationally symmetrical configuration, for example, this should be regarded as merely exemplary. In many cases, application requirements call for a deviation from such a configuration. Moreover, projections do not have to have a continuous form, for example, but can also be provided portion by portion. Accordingly, the end which faces the housing interior I in the connecting direction to a mating connector and has the chamfer 22 does not have to be a continuous annulus, but can be formed by individual projections and still have the same effect. In this regard, it is likewise possible that this end terminates in a flush manner so that a housing interior II is not formed.

THE LIST OF REFERENCE SIGNS IS AS FOLLOWS

1 Connector module
10 Housing
11 Axial inner face (of the housing)
12 Housing projection
20 Connector
21 Axial outer face (of the connector)
22 Chamfer
30 Sealing element
40 (Connector)strip
41 Strip projection
42 Through bore
50 Contact pin
I, II Housing interior
III Exterior
L20 Longitudinal axis (of the connector)

The invention claimed is:

1. A connector module, comprising:

a housing, a connector, which is arranged in the housing, at least in part, and which has a longitudinal axis in a connecting direction to a mating connector, wherein an axial outer face of the connector with respect to the longitudinal axis is radially spaced from an opposing axial inner face of the housing, at least in part, and a sealing element, wherein the sealing element is arranged in the radial clearance formed between the axial outer face of the connector and the opposing axial inner face of the housing and forms a sealing face with the axial outer face of the connector and the opposing axial inner face of the housing in each case, and wherein the connector has a chamfer at an end of the axial outer face of the connector which faces the housing interior in the connecting direction to a mating connector, and/or the housing has a chamfer at an end of the axial inner face of the housing which faces away from the housing interior in the connecting direction to a mating connector.

2. The connector module of claim 1, wherein the housing has a housing projection, which points in the direction of the connector in the radial direction with respect to the longitudinal axis of the connector, and the sealing element is arranged on a side of the housing projection which faces a housing interior in the connecting direction to a mating connector.

3. The connector module of claim 1, wherein the connector has a connector projection, which points in the direction of the housing in the radial direction with respect to the longitudinal axis of the connector, and the sealing element is arranged on a side of the connector projection which faces a housing interior in the connecting direction to a mating connector.

4. The connector module of claim 1, wherein the axial outer face of the connector and/or the axial inner face of the housing has a tangential groove in which the sealing element is at least partially arranged.

5. The connector module of claim 1, wherein the chamfer includes at least two sloping portions.

6. The connector module of claim 5, wherein the sloping portions are separated by an intermediate portion extending substantially parallel to the longitudinal axis and/or have different slopes.

7. A connector module, comprising:

a housing, a connector, which is arranged in the housing, at least in part, and which has a longitudinal axis in a connecting direction to a mating connector, wherein an axial outer face of the connector with respect to the longitudinal axis is radially spaced from an opposing axial inner face of the housing, at least in part, and a sealing element, wherein the sealing element is arranged in the radial clearance formed between the axial outer face of the connector and the opposing axial inner face of the housing and forms a sealing face with the axial outer face of the connector and the opposing axial inner face of the housing in each case, and wherein the connector module includes a strip, which is arranged on a side of the connector which faces the housing interior in the connecting direction to a mating connector and at least partially covers the radial clearance formed between the axial outer face of the connector and the opposing axial inner face of the housing.

8. The connector module of claim 7, wherein the strip forms a strip projection, which protrudes into the radial clearance formed between the axial outer face of the connector and the opposing axial inner face of the housing.

9. The connector module of claim 7, wherein the connector includes electrical contact pins and the strip is formed as a connector strip for feeding through the electrical contact pins.

10. The connector module of claim 9, wherein the connector strip has through bores for feeding through the electrical contact pins, which through bores are formed with a diameter which tapers, in a funnel-shape, at least over a predetermined portion, beginning on the side which faces the connector.

11. A connector module, comprising:

a housing, a connector, which is arranged in the housing, at least in part, and which has a longitudinal axis in a connecting direction to a mating connector, wherein an axial outer face of the connector with respect to the longitudinal axis is radially spaced from an opposing axial inner face of the housing, at least in part, and a sealing element, wherein the sealing element is arranged in the radial clearance formed between the axial outer face of the connector and the opposing axial inner face of the housing and forms a sealing face with the axial outer face of the connector and the opposing axial inner face of the housing in each case, and wherein the connector module includes a strip, which is arranged on a side of the connector which faces the housing interior in the connecting direction to a mating connector and at least partially covers the radial clearance formed between the axial outer face of the connector and the opposing axial inner face of the housing, and wherein the sealing element is integrally formed with the strip, the connector and/or the housing.

12. A connector for connecting to a mating device of a connector module, comprising:

a mating device of the connector module;

wherein the connector module, includes:

a housing, wherein the connector, which is arranged in the housing, at least in part, and has a longitudinal axis in a connecting direction to a mating connector, wherein an axial outer face of the connector with respect to the longitudinal axis is radially spaced from an opposing axial inner face of the housing, at least in part, and a sealing element, wherein the sealing element is arranged in the radial clearance formed between the axial outer face of the connector and the opposing axial inner face of the housing and forms a sealing face with the axial outer face of the connector and the opposing axial inner face of the housing in each case, and wherein the connector has a chamfer at an end of the axial outer face of the connector which faces the housing interior in the connecting direction to a mating connector, and/or the housing has a chamfer at an end of the axial inner face of the housing which faces away from the housing interior in the connecting direction to a mating connector.

13. A method for assembling a connector module, the method comprising:

arranging a sealing element in a housing or around a connector; and positioning the connector in the housing along a connecting direction of the connector to a mating connector;

wherein the sealing element, during the positioning, is stretched and/or compressed radially with respect to a longitudinal axis of the connector which extends in a connecting direction;

wherein the connector module includes:

the housing, the connector, which is arranged in the housing, at least in part, and which has the longitudinal axis in the connecting direction to the mating connector, wherein an axial outer face of the connector with respect to the longitudinal axis is radially spaced from an opposing axial inner face of the housing, at least in part, and the sealing element, wherein the sealing element is arranged in the radial clearance formed between the axial outer face of the connector and the opposing axial inner face of the housing and forms a sealing face with the axial outer face of the connector and the opposing axial inner face of the housing in each case, and wherein the connector has a chamfer at an end of the axial outer face of the connector which faces the housing interior in the connecting direction to a mating connector, and/or the housing has a chamfer at an end of the axial inner face of the housing which faces away from the housing interior in the connecting direction to a mating connector.

14. The method of claim 13, wherein the positioning of the connector in the housing takes place from a side which faces away from the housing interior.

* * * * *